US006681864B2

(12) United States Patent
Tvetene et al.

(10) Patent No.: US 6,681,864 B2
(45) Date of Patent: Jan. 27, 2004

(54) SOD HARVESTER (76) Inventors: Donald Tvetene, 6844 S. Frontage Rd., Billings, MT (US) 59101; Michael Tvetene, 12 Willow Bend Dr. South, Billings, MT (US) 59102; Gregg Tvetene, 6844 S. Frontage Rd., Billings, MT (US) 59101

( * ) Notice: Subject to any disclaimer, the term of this patent is extended or adjusted under 35 U.S.C. 154(b) by 0 days.

(21) Appl. No.: 10/016,546

(22) Filed: Dec. 11, 2001

(65) Prior Publication Data

US 2002/0043375 A1 Apr. 18, 2002

Related U.S. Application Data (62) Division of application No. 09/603,161, filed on Jun. 26, 2000.

(51) Int. Cl.[7] .............................................. A01B 45/04
(52) U.S. Cl. ...................................... 172/20; 56/10.2 F
(58) Field of Search ............................. 172/19, 20, 36, 172/2, 5, 6; 414/540, 911, 792.4, 791.6; 193/3; 56/10.2 F, 10.2 R (56) References Cited

U.S. PATENT DOCUMENTS

| | | | | |
|---|---|---|---|---|
| 1,349,926 A | * | 8/1920 | Thompson | |
| 2,682,824 A | * | 7/1954 | Bowser et al. | |
| 3,580,375 A | * | 5/1971 | Nunes, Jr. | |
| 3,672,452 A | * | 6/1972 | Miner | |
| 3,877,584 A | * | 4/1975 | Holcombe | |
| 4,345,659 A | * | 8/1982 | Arnold | 180/401 |
| 4,354,556 A | * | 10/1982 | Evans | |
| 4,507,910 A | * | 4/1985 | Thornley et al. | 56/10.2 E |
| 4,573,124 A | * | 2/1986 | Seiferling | 701/50 |
| 4,616,713 A | * | 10/1986 | Shattuck | |
| 4,733,355 A | * | 3/1988 | Davidson et al. | 701/50 |
| 4,754,815 A | * | 7/1988 | Brouwer et al. | |
| 4,777,890 A | * | 10/1988 | Raymond | |
| 4,832,130 A | * | 5/1989 | Brouwer et al. | |
| 4,883,965 A | * | 11/1989 | Bohman | 250/341.7 |
| 4,918,441 A | * | 4/1990 | Bohman | 340/901 |
| 4,933,853 A | * | 6/1990 | Musil et al. | 701/50 |
| 4,944,352 A | * | 7/1990 | Brouwer et al. | |
| 5,031,705 A | * | 7/1991 | Clemens | 172/6 |
| 5,170,848 A | * | 12/1992 | Walton | 172/19 |
| 5,348,226 A | * | 9/1994 | Heiniger et al. | 239/1 |
| 5,911,669 A | * | 6/1999 | Stentz et al. | 56/10.2 F |
| 6,152,238 A | * | 11/2000 | Ferrell et al. | 172/2 |
| 6,244,354 B1 | * | 6/2001 | Van Vuuren | |
| 6,296,063 B1 | * | 10/2001 | Tvetene et al. | |
| 6,364,028 B1 | * | 4/2002 | Ferrell et al. | 172/1 |

* cited by examiner

*Primary Examiner*—Victor Batson
(74) *Attorney, Agent, or Firm*—Jacobson & Johnson (57) ABSTRACT

A method the method of transferring a roll of sod while inhibiting an unwinding of the roll of sod comprising the steps of: (a) rolling a slab of sod into a first sod roll; (b) forcing the first sod roll onto a sod roll handling mechanism containing a second sod roll with the first sod roll forming pressure contact with the second sod roll on the sod roll handling mechanism; and (c) advancing the sod roll handling mechanism with the second sod roll while maintaining the first sod roll and the second sod roll in pressure contact to thereby inhibit the unwinding of the first sod roll as the first sod roll is transferred to the handling mechanism and an sod harvester guidance system for maintaining a full cut.

6 Claims, 9 Drawing Sheets

SOD HARVESTER

CROSS REFERENCE TO RELATED APPLICATIONS

This application is a divisional application claiming priority from my co-pending patent application Ser. No. 09/603,161; filed Jun. 26, 2000; titled Sod Harvester.

FIELD OF THE INVENTION

This invention relates generally to sod harvesting equipment and more specifically to a sod harvester guidance system and a method and apparatus for transferring sod rolls while maintaining the integrity of the transferred sod rolls.

BACKGROUND OF THE INVENTION

The concept of sod harvesting is old in the art. Typically, a sod slab is cut free from a sod field. The slab is then rolled up into a cylindrical roll that is transferred to a pallet by a sod pickup mechanism. If the sod rolls are "small rolls", the sod rolls can be manually transferred to a sod delivery truck that delivers the sod to the area where the sod rolls are to be laid. If the sod rolls are "big rolls", it is necessary to use equipment to both lift and transfer the sod rolls. Numerous devices are available for mechanizing portions of the sod harvesting and delivering process. For example, U.S. Pat. No. 5,230,602 shows a sod roll stacker for stacking rows of small rolls. Still other devices are available for cutting and rolling both small rolls and big rolls.

One of the problems with handling sod rolls is the loose or free end of the sod roll can be located in any angular position of the sod roll which can result in at least partially unwinding of the sod roll during handling, which makes it difficulty to transfer the sod roll, while maintaining the integrity of the sod roll. Typically, the sod rolls are formed by elevating a sod slab along an elevator while a top stationary member engages the edge of the sod to roll the sod slab into a roll. The sod roll is then delivered to a trough on a bed where the sod rolls are then transferred to a pallet for delivery to the work site. The transferring of the sod rolls from one mechanism to another mechanism can result in partially unwinding of the sod roll causing difficulties in picking up the sod roll as well as tearing the sod roll. In addition to damage to the sod roll, it usually requires the operator to stop the machine and clear the machine of any damaged sod rolls.

The sod harvesting system of the present invention also includes a steering mechanism to maintain the sod harvester in proper alignment with the sod to be cut with the steering mechanism including an ultrasonic sensor.

A sod harvester having a sod rolling device is shown in our copending patent application Titled Sod Harvester, Ser. No. 09/236,170 filed Jan. 25, 1999 and is incorporated herein by reference. The present invention provides a guidance system a method and apparatus for transferring sod rolls from one mechanism to another while maintaining the integrity of the transferred sod rolls.

SUMMARY OF THE INVENTION

Briefly, the present invention comprises a method of transferring sod rolls while maintaining the integrity of the sod rolls by maintaining a sod roll in pressure contact with another sod roll while the sod roll is being transferred from one sod roll handling mechanism to another sod roll handling mechanism and a sod harvester guidance system using a sonic transducer for maintaining a full cut.

DESCRIPTION OF PRIOR ART

U.S. Pat. No. 4,345,659 discloses a steering mechanism for sod processing that uses a mechanical connection to control the direction of the sod processor.

DESCRIPTION OF THE PREFERRED EMBODIMENT

Figure 1:
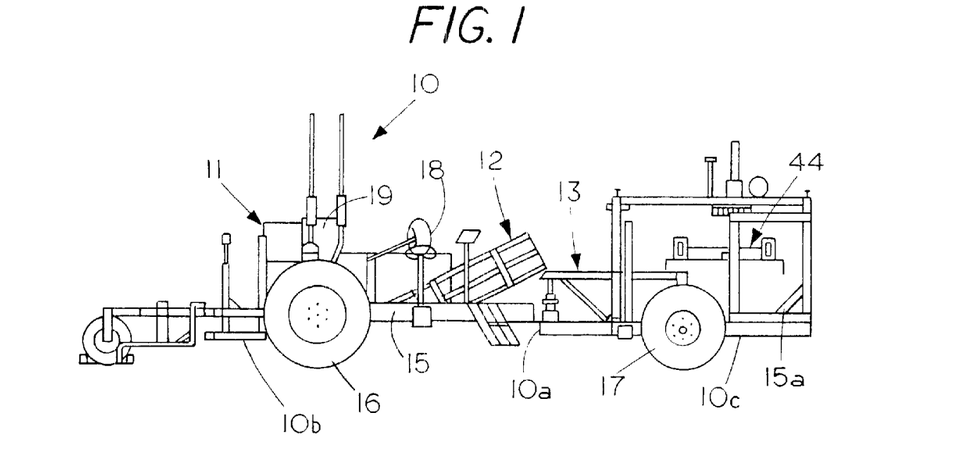
FIG. 1 is a side elevation of the on-the-go sod harvester for the automatic cutting, rolling and storing of sod.

FIG. 1 is a side view of the on-the-go sod harvester 10 for the automatic cutting, rolling and storing of sod. The sod harvester includes a sod cutting mechanism 11 for freeing a section of sod from a sod field, a sod roller 12 for rolling the section of sod into a sod roll, a sod roll accumulator 13 having sod carriers therein for receiving and holding the sod roll therein, a sod roll pickup mechanism 14 for lifting the sod roll onto the sod roll accumulator 13 and transferring the sod roll to a sod carrier 15a for delivery of the sod roll and a pallet carrier 44 for holding a pallet for sod thereon. The sod cutting mechanism 11, the sod roller 12, the sod roll accumulator 13, the sod pickup mechanism 14, and the sod carrier 15a are supported on a frame 15. The frame 15 has a set of front wheels 16 and a set of rear wheels 17 and an operator's console 18 together with a motor 19 for driving the sod harvesting machine over a sod field.

The vehicle includes an articulation joint 10a between a front section 10b and a rear section 10c. Articulation joints are known and described in the prior art and will not be described herein. Examples of articulation joints can be found in U.S. Pat. Nos. 5,725,063; 5,632,350; 5,984,032 and 6,012,272. While the use of articulation joints for use in steering a vehicle is known in the art the use of articulation joints in a sod harvester permits the sod harvester to precisely follow the path of the cut sod. That is, in harvesting sod a strip of sod is removed leaving a step in the soil between where the sod was removed and the sod that remains. One of the difficulties with a sod harvester is that if the sod harvester has to follow a field where the sod that has been removed is not straight the sod harvester may not precisely track thus leaving sod or providing sod slabs with less than a complete sod roll. By using an articulated sod harvesting machine the front portion of the harvester that frees the sod from the ground can be precisely positioned so that the front portion of the harvester tracks in a path that harvests a complete sod slab without leaving uncut sod.

In the present invention, the operator performs the function of driving the sod harvester over the turf field but the cutting, rolling and storing of sod are accomplished automatically without any required input from the operator. If desired, the operator can interfere with the automatic process and manually override portions of the process using the operator's console 18. However, in the preferred embodiment, the automatic operations are preferred since they require an operator with less skill.

Figure 2:
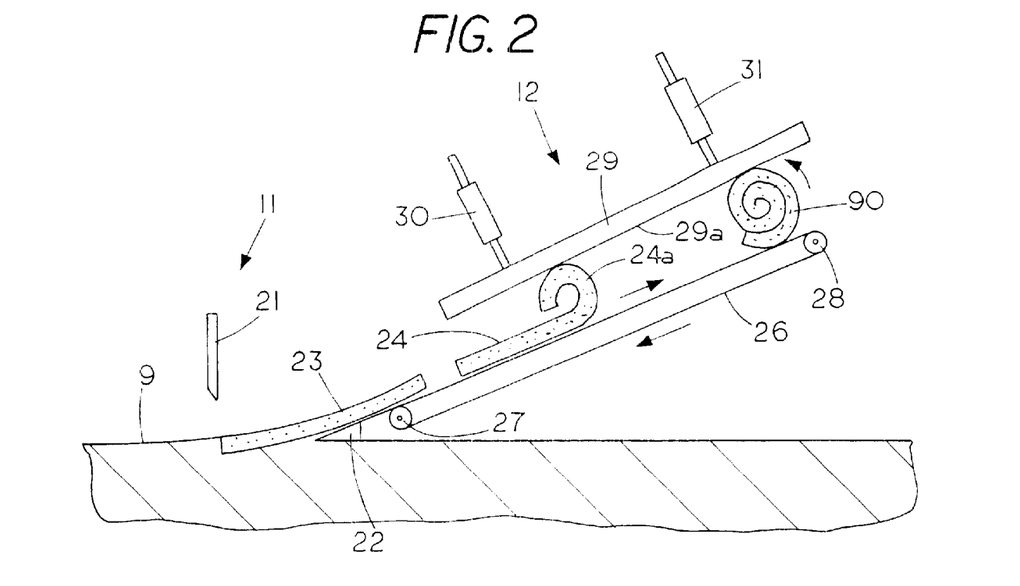
FIG. 2 is a partial schematic view showing the cutter and the sod roller for rolling a sod slab into a sod roll.

FIG. 2 is a partial schematic view showing the sod cutting mechanism 11 having a vertical cutoff blade 21 and a horizontal cutting blade 22 for freeing a slab of sod 23 from turf 9. A set of side cutters (not shown) free the edges of sod slab 23. The process and apparatus for cutting and freeing a slab of sod from a turf field is well known in the art. A sod slab 24, which has a partially rolled end 24a, is shown on the lower end of sod roller 12. In operation, the sod slab 24 is elevated by a rotatable belt 26 that is located at an angle and is supported and driven by roller 28 which is powered by sod harvester 10. Located above sod belt 26 is a friction member 29 that is held in pressure engagement with the sod on belt 26 by the resilient members 30 and 31. Friction member 31 is free to move laterally toward and away from rotatable belt 26 but is prevented from moving in the direction of belt travel by restraining members (not shown). In operation of the sod roller 12, the underside 29a of member 29 frictionally engages the leading end of sod slab 24 to initiate rolling of sod slab into a roll as indicated by numeral 24a. A further sod slab 25, which is located at the top of rotatable belt 26 is shown in a rolled condition. The rolled sod 90 is rotating in a counter clockwise direction, as indicated by the arrow, and will be elevated up and over the drive wheel 28 so that the sod roll 90 can be dropped into the sod accumulator 13.

Figure 3:
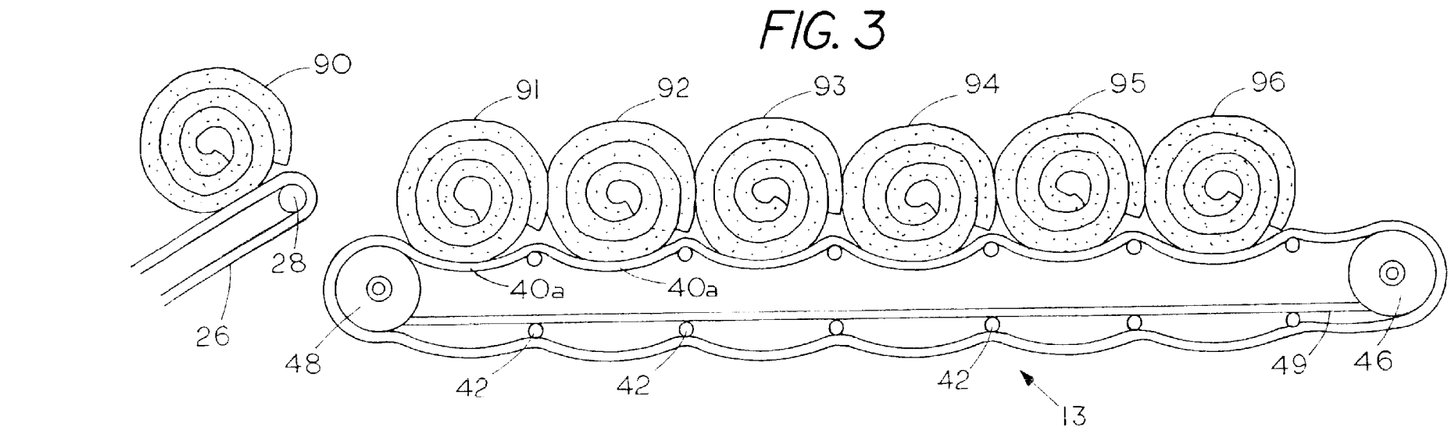
FIG. 3 shows a side view of the sod accumulator about to receive a sod roll.

FIG. 3 shows a side view of a sod handling mechanism such as an accumulator 13 for receiving a plurality of sod rolls The sod roll accumulator 13 includes a plurality of flexible belts 40 that are supported at spaced, lateral intervals by fixed engagement with cross members 42. The belts hang down between the cross members 42 to form a set of parallel spaced sod carriers 40a for receiving and holding a plurality of sod rolls in side by side condition. The belts are intermittently rotated in a clockwise direction by drive pulleys 48 and 46 and a drive mechanism (not shown). The rotation of the belt 40 can be seen by viewing the position of sod rolls thereon in FIG. 3 to FIG. 6.

In the mode shown in FIG. 3 a sod roll 90 is being elevated by elevator 26 and is at an elevated position prior to being transferred from elevator 26 to sod roll accumulator 13. Sod roll accumulator 13 is shown with a plurality of sod rolls 91, 92, 93, 94, 95 and 96 thereon with each of the sod rolls supported in horizontal condition and with each of the sod rolls in pressure contact with an adjacent sod roll to thereby inhibit unwinding of the sod rolls as the sod rolls are transported on the accumulator 13. If the sod rolls are maintained in side to side contact even though the end of the sod roll is in any angular position the sod roll can be maintained in a wound condition.

Figure 4:
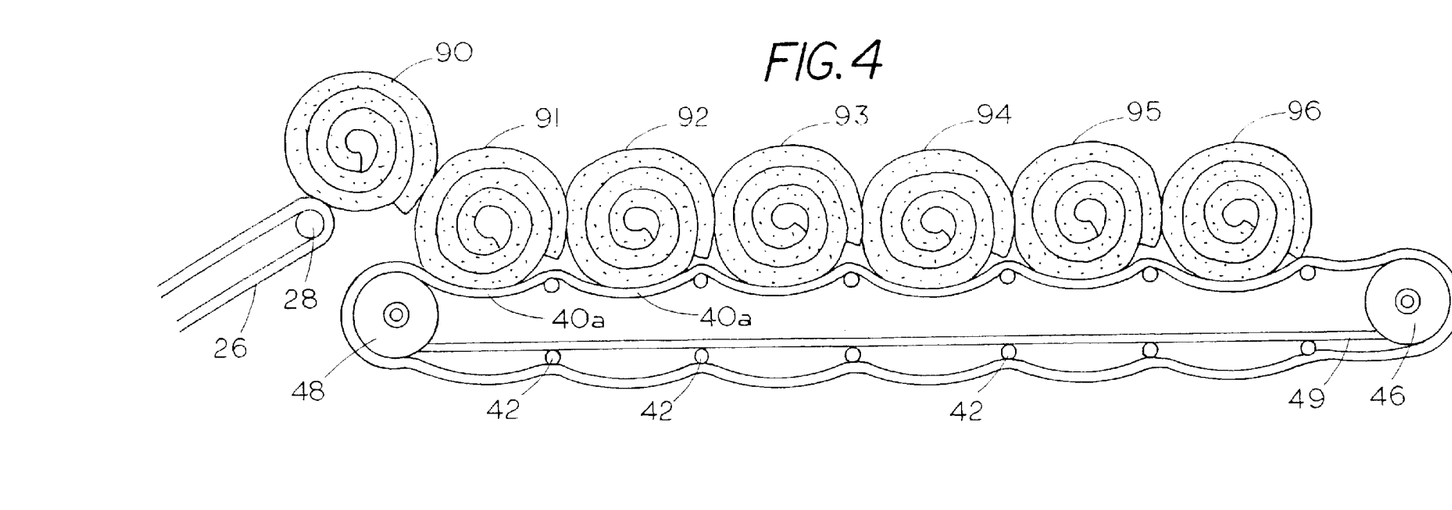
FIG. 4 shows the side view of the sod accumulator shown in FIG. 3 with a sod roll having been brought into pressure engagement with a sod roll on a the accumulator.

FIG. 4 shows a sod roll transfer condition as sod roll 90 on elevator 26 is transferred from elevator 26. The sod roll 90 move laterally away from elevator 26 but also falls downward under the force of gravity until sod roll 90 engages sod roll 91 thereby temporarily preventing further downward displacement of sod roll 90. It has been found that this step of engaging one sod roll with another stops the sod roll loose ends from unwinding during the subsequent handling as well as transfer from the elevator to the accumulator.

Figure 5:
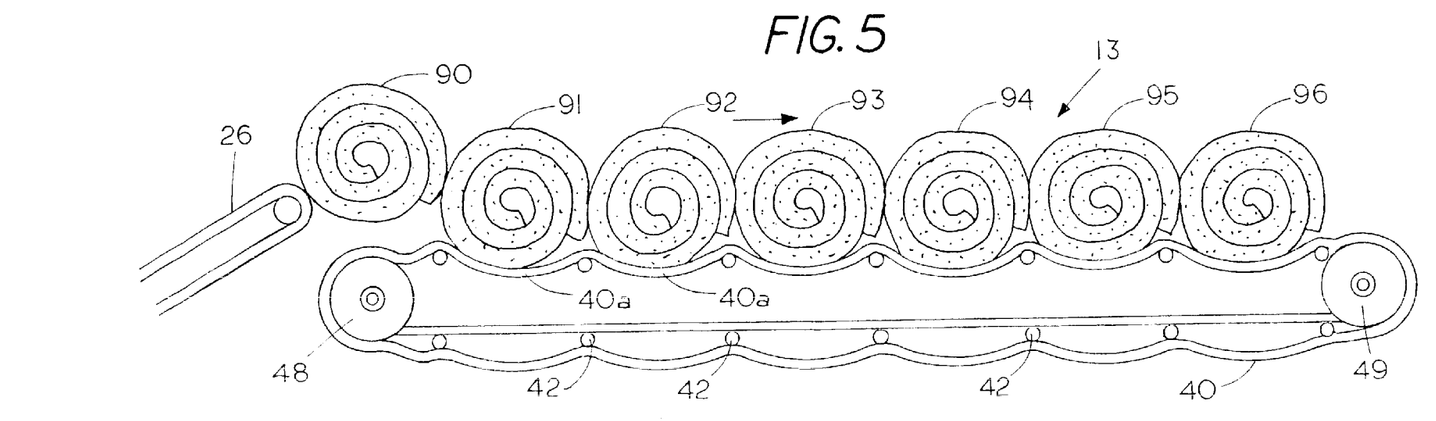
FIG. 5 shows the side view of the sod accumulator shown in FIG. 3 with a sod roll been lowered onto the sod roll accumulator while the sod roll is maintained in pressure engagement with a sod roll on a the accumulator.

FIG. 5 shows the advancement of accumulator 13 which is moving rolls 91–96 to the right. As accumulator moves rolls 91–96 to the right it creates a space on the left end of accumulator 13 and allows sod roll 90 to fall toward sod roll accumulator 13 as the sod roll 90 continues to maintain pressure contact with adjacent sod roll 91 thereby inhibiting the unrolling of either sod roll 90 or 91.

Figure 6:
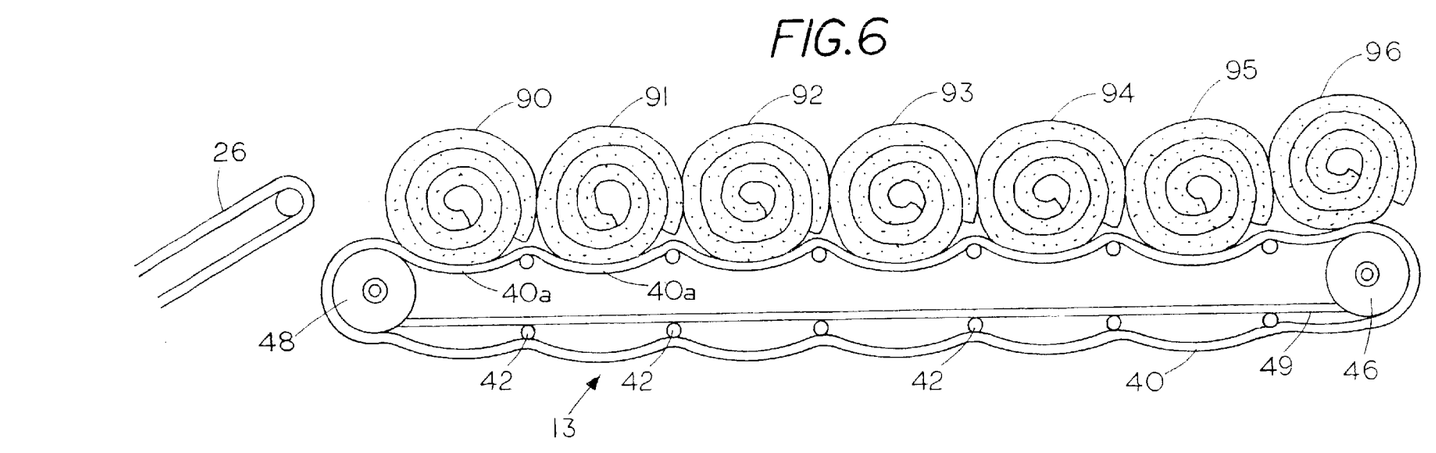
FIG. 6 shows the side view of the sod accumulator shown in FIG. 3 with a sod roll transferred onto the sod roll accumulator and the sod roll accumulator having displaced all the sod rolls to a different position.

FIG. 6 shows the sod roll accumulator 13 advanced to the pickup position wherein sod roll 90 is now positioned on sod roll accumulator 13 along with sod rolls 91–96 with each of the sod rolls maintained in pressure contact with an adjacent sod roll to inhibit unrolling of the sod rolls.

Figure 7:
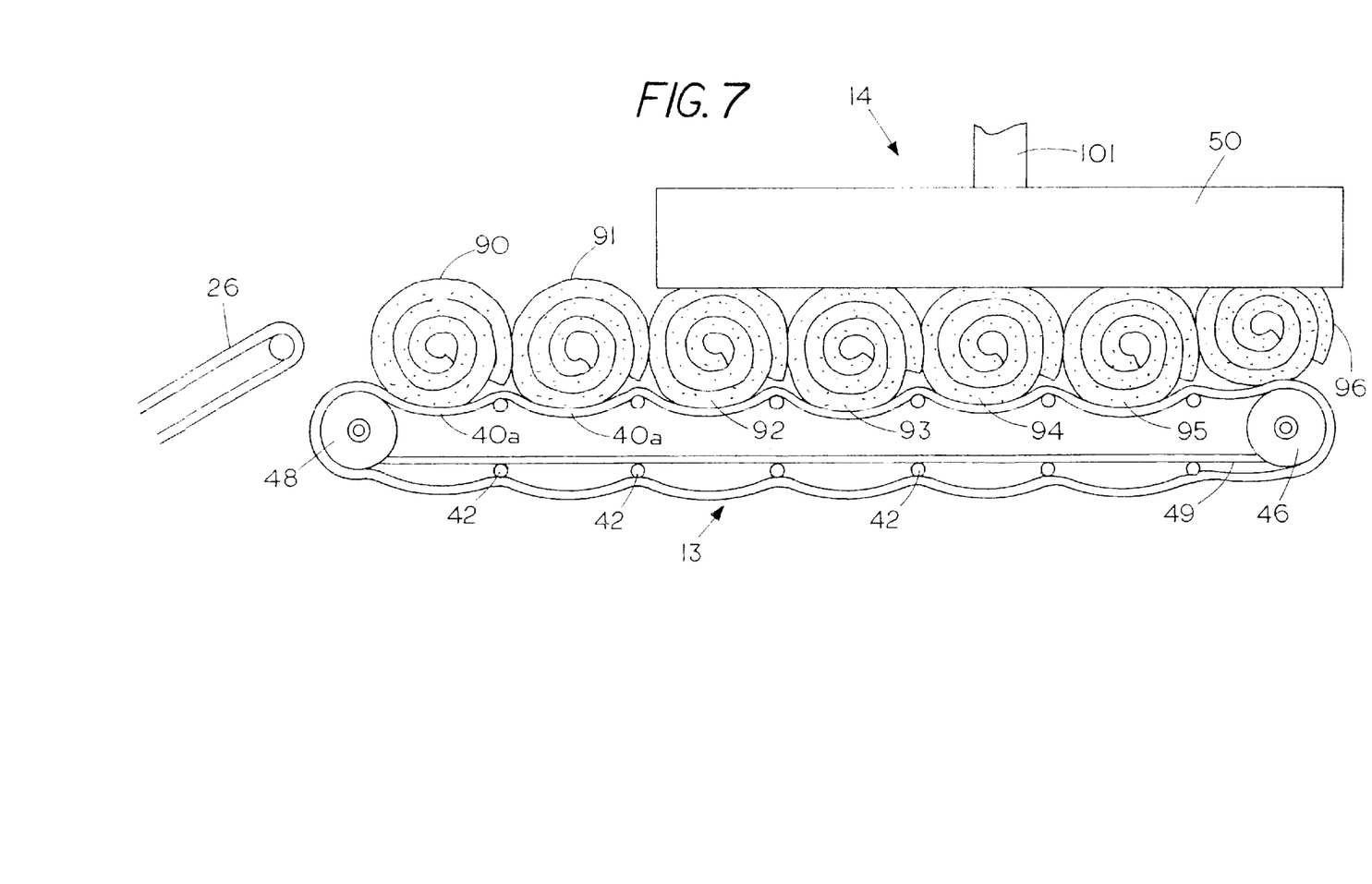
FIG. 7 shows the side view of the sod accumulator shown in FIG. 3 with a sod roll pickup mechanism engaging the sod rolls for pick up.

FIG. 7 shows sod rolls 92, 93, 94, 95, and 96 positioned under a sod roll pickup mechanism 14 that includes rotateable support 101 and frame 50. Sod roll pickup mechanism frame 50 is only in pressure engagement with sod rolls 92, 93, 94, 95, and 96 while sod roll 90 and 91 are free of contact with pickup mechanism 14.

Thus the present invention comprises the method of transferring a roll of sod while inhibiting an unwinding of the roll of sod comprising the steps of: (a) rolling a slab of sod into a first sod roll; (b) forcing the first sod roll onto a sod roll accumulator containing a second sod roll with the first sod roll forming pressure contact with the second sod roll on the sod roll accumulator; and (c) advancing the sod roll accumulator with the second sod roll while maintaining the first sod roll and the second sod roll in pressure contact to thereby inhibit the unwinding of the first sod roll as the fist sod roll is transferred to the accumulator.

Figure 8:
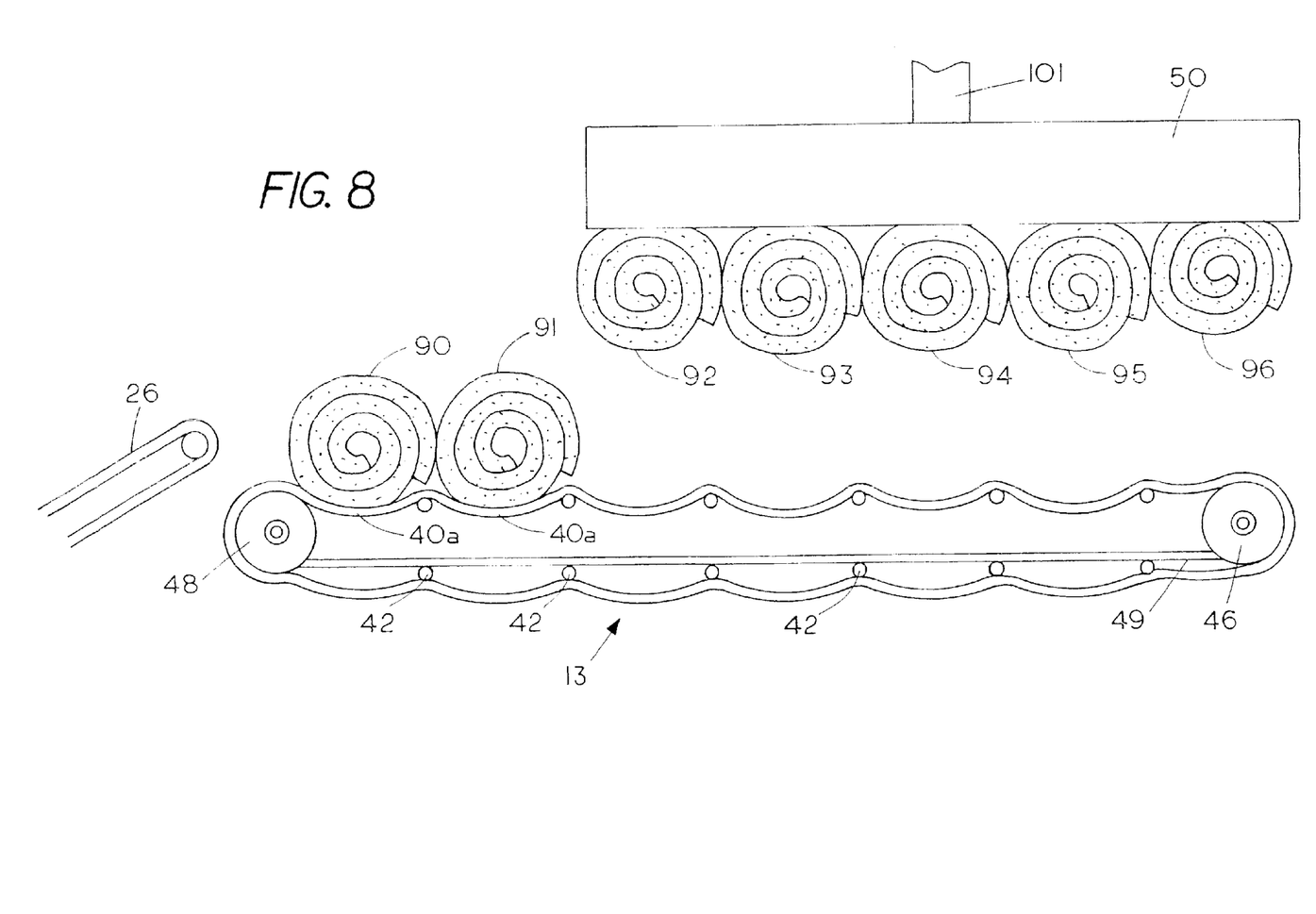
FIG. 8 shows the side view of the sod accumulator shown in FIG. 8 with a sod roll pickup mechanism having lifted some of the sod rolls free of the sod roll accumulator.

FIG. 8 shows that the frame 50 with a set of retractable spikes therein has been used to lift sod rollers 92–96 free of the accumulator 13. It will be appreciated that in lifting the rolls of sod 92–96 that a sod roll 90 and a sod roll 91 have been left on accumulator 13. The purpose of leaving at least one sod roll on accumulator 13 is so that when the next sod roll is transferred the sod roll 90 is available to form pressure engagement with the sod roll delivered from the elevator 26 and thus inhibit the unwinding of the sod roll as it is delivered to the accumulator.

Thus the method of the present invention includes placing at least "n" sod rolls on the sod roll accumulator and removing "n–1" sod rolls from the accumulator to thereby leave at least one sod roll on the accumulator to form pressure engagement with a further sod roll to be transferred to the accumulator.

In the preferred embodiment the sod roll accumulator 13 is maintained in a horizontal position and the sod roll accumulator is displaced horizontally while the first sod roll is displaced horizontally and vertically by the force of gravity to thereby allow the weight of the sod roll 90 to maintain pressure contact with the sod roll 91 on the accumulator as the sod roll is transferred thereto.

It will be envisioned that sod harvesting including the cutting, rolling and accumulation of sod rolls is accomplished while the sod harvester 10 is on-the-go and without operator input. That is, as sod harvester 10 moves forward, the sod slab is cut, rolled and stored without the necessity of having the operator manually perform any of the steps of the sod harvesting operation.

Figure 9:
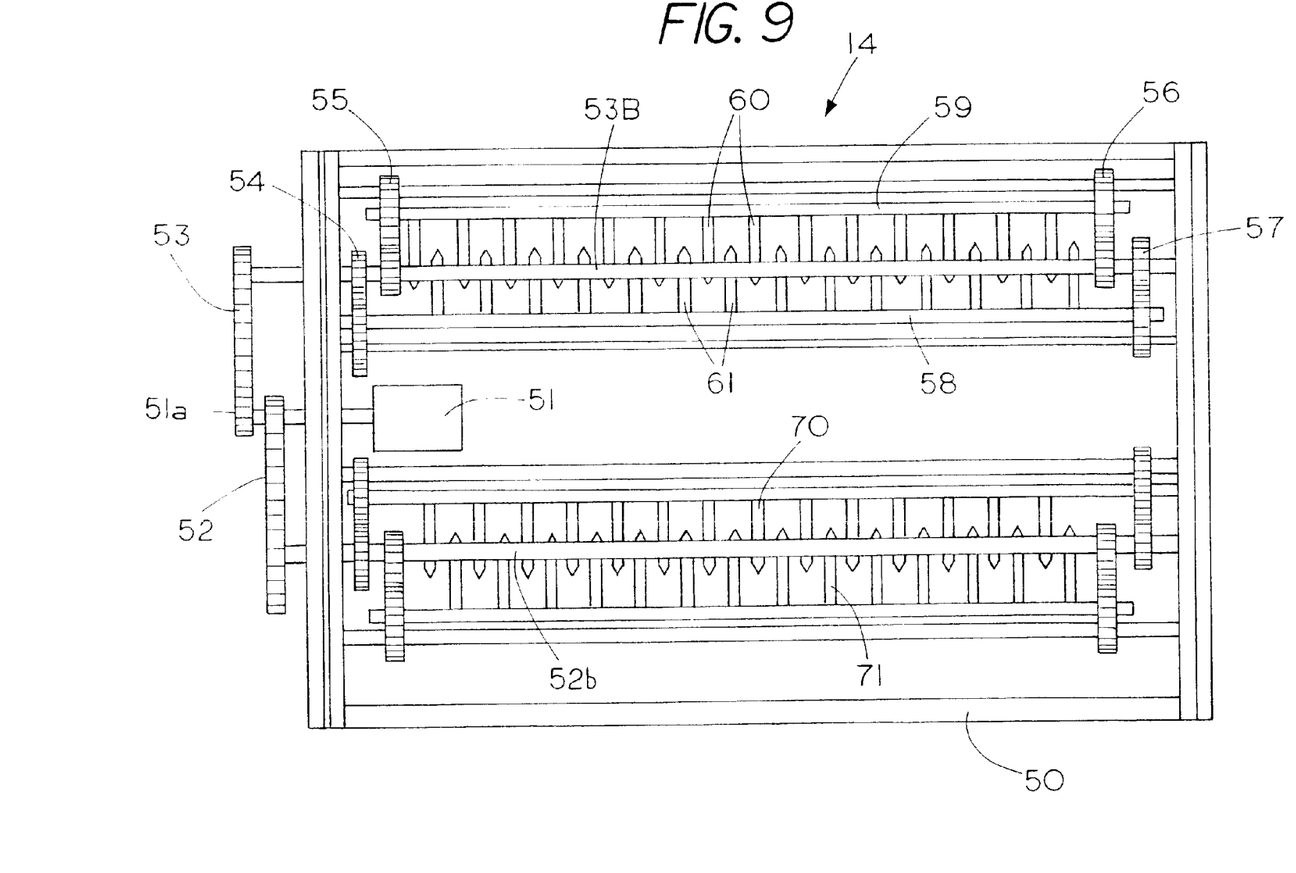
FIG. 9 is a top view of the sod roll pickup mechanism.

FIG. 9 shows a schematic top view of the sod roll pickup mechanism 14 which includes a frame 50 with a first set of retractable spikes comprised of a first row of spikes 60 and a second row of spikes 61 and a second set of retractable spikes comprised of a first row of spikes 70 and a second row of spikes 71. The retraceable spikes are slideable laterally along guides (not shown) to form a piercing engagement with a set of sod rolls located on accumulator 13.

The retractable spikes are extended and retracted by a power drive mechanism 51 that is mounted on frame 50. Power drive mechanism 51 rotates a double sprocket wheel 51a which is connected to sprocket wheel 53a through chain 53 and similarly to sprocket wheel 52a through chain 52.

In operation of the sod roll pickup mechanism 14, the sprocket wheel 51a is rotated in a first direction to extend the retractable spikes and in the opposite direction to retract the retractable spikes. FIG. 6 is a side view showing the sod roll pickup mechanism 14 with the two sets of retractable spikes in the retracted position and FIG. 7 is a side view showing the sod roll pickup mechanism 14 with the retractable spikes in the extended position.

In the operation of the sod roll pickup mechanism, the rotation of sprocket wheel 51a simultaneously rotates chain 53 and chain 52. The rotation of chain 53 in a first direction causes rotation of sprocket wheel 53a which in turn rotates shaft 53b. The rotation of shaft 53b rotates chains 55, 54, 56 and 57. As one set of spikes are mounted to the upper portion of the rotating chains and the other to the lower portions of the rotating chains the rotation of the chains cause the set of spikes to extend and retract in unison. A first bar 59 connected to chains 55 and 56 holds retractable spikes 60 and a second bar 58 connects to chains 57 and 54 so that rotation of chains 54, 55, 56, and 57 slides spikes 60 and 61 downward to the position shown in FIG. 7. The rotation of chain 53 in the opposite direction causes rotation of sprocket wheel 53a in the opposite direction which in turn rotates shaft 53b in the opposite direction. The rotation of shaft 53b in the opposite direction also rotates chains 55, 54, 56 and 57 in the opposite direction. Consequently, the first bar 59 which is connected to chains 55 and 56 slides upwards to retract retractable spikes 60 and the second bar 58 which is connects to chains 57 and 54 also slides upward so that rotation of chains 54, 55, 56, and 57 in the opposite direction moves spikes 60 and 61 upward into the position shown in FIG. 7. As the two sets of retractable spikes operate in an identical manner, only one set of retraceable spikes is described herein. Each set of spikes comprises cylindrical members having a pointed end for piercing the sod roll. The spikes are spaced sufficiently close so that multiple spikes will engage a sod roll to hold the sod roll during the pickup and transfer process.

Figure 10:
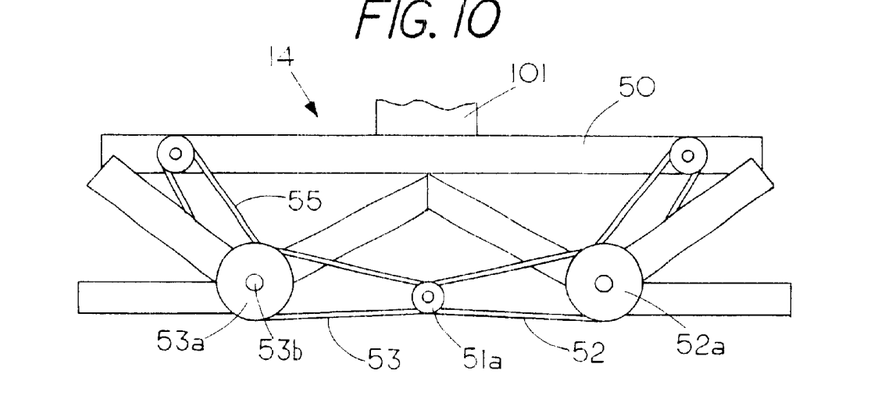
FIG. 10 is an end view of the sod roll pickup mechanism of FIG. 9 with the retractable spikes in the retracted condition.
Figure 12:
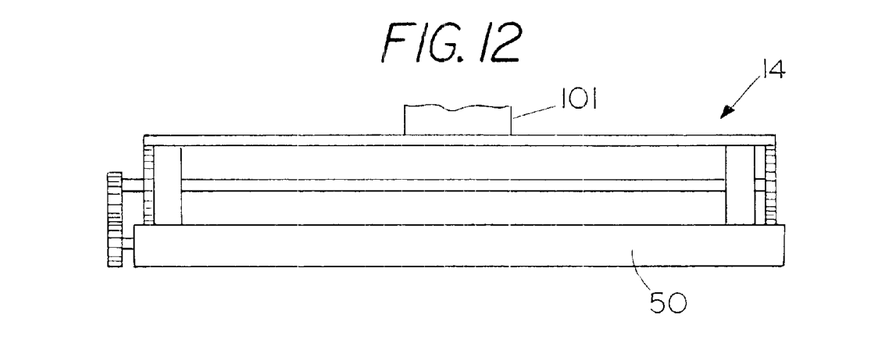
FIG. 12 is a front view of the sod roll pickup mechanism of FIG. 9 with the spikes retracted.

FIG. 10 is an end view of the sod roll pickup mechanism 14 with the retractable spikes in the retracted condition and FIG. 12 is a front view of sod roll pickup mechanism 14. It should be pointed out that the sod roll pickup mechanism is an overhead mechanism for picking up sod rolls from above rather than from below.

Figure 11:
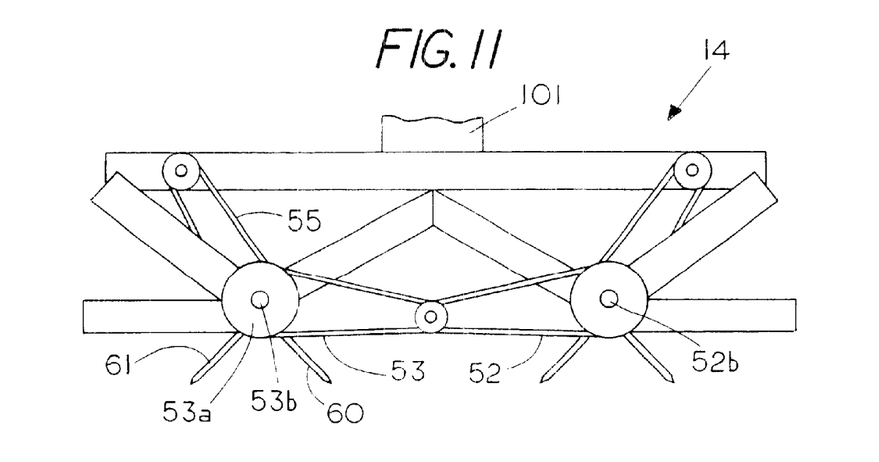
FIG. 11 is a side view of the sod roll pickup mechanism of FIG. 9 showing the sod roll pickup mechanism with the retractable spikes in the extended position.
Figure 13:
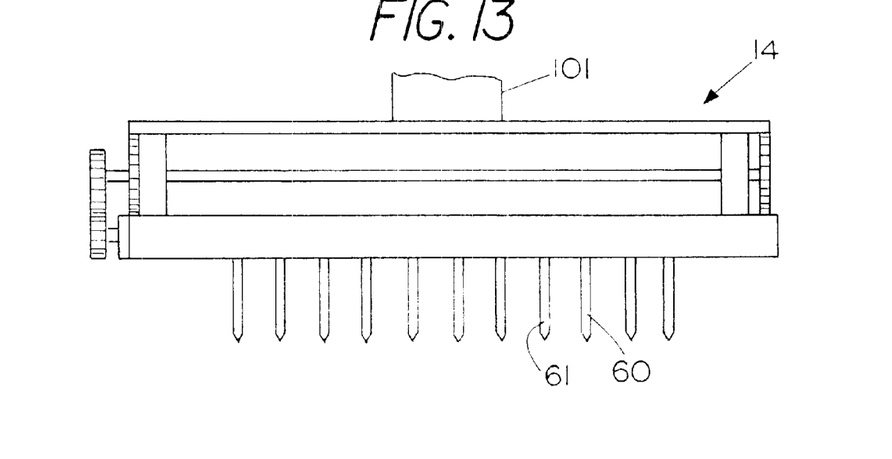
FIG. 13 is a front view of the sod roll pickup mechanism shown in FIG. 12 with the spikes in the extended condition.

FIG. 11 shows an end view of the sod roll pickup mechanism 14, while empty, and FIG. 13 is a front view of sod roll pickup mechanism 14 in the empty condition.

FIG. 7 is front view of the sod roll pickup mechanism 14 shown in with a plurality of sod rolls 90, 91, 92, 93 and 94 suspended thereunder for movement and placement of the sod rolls on a stack. In operation of sod roll pickup mechanism 14, the sod roll pickup mechanism 14 is normally located in the open condition illustrated in FIG. 12. Next, the sod roll pickup mechanism is lowered onto the top of a layer of sod rolls that are located on the sod roll accumulator 13.

FIG. 7 shows the sod roll pickup mechanism 14 located on top of sod rolls 90, 91, 92, 93 and 94. Once the sod rolls are in position, the sets of retractable spikes 60, 61, 70 and 71 are extended downward at an angle to pierce the sod rolls in both the horizontal and vertical directions. That is, the spikes extend angularly into the rolls of sod to hold the sod rolls as a unit in the sod roll pickup mechanism 40 so that a lifting head 101 can lift the sod roll pickup mechanism and the sod rolls and place the sod rolls on a carrier. Once placed on a carrier, the sets of retractable spikes are retracted to leave the sod rolls in a neat layer of sod rolls on a pallet or the like.

Figure 14:
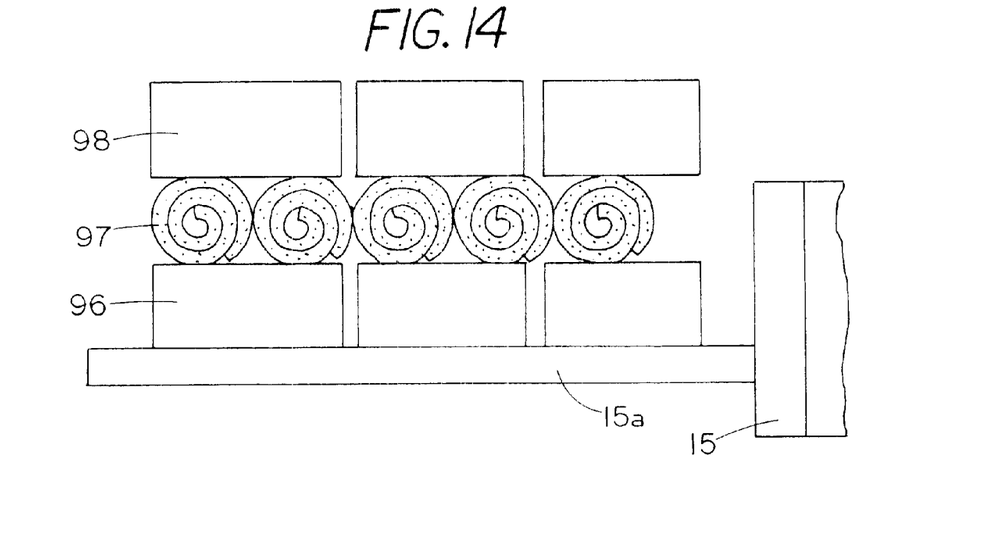
FIG. 14 is a side view of a plurality of sod rolls in an alternate stacked condition.

FIG. 14 shows the sod rolls stacked with the central axis of each level of sod rolls is in a perpendicular arrangement with the sod rolls above and below it. That is, layers 96, 97 and 98 are located on sod carrier 15a which is attached to frame 15, but the axis of the rolls of each layer of sod rolls is oriented at a right angle to the layer of sod rolls adjacent thereto. Sod carrier 15a can (if desired) include a pallet so that a stack of sod rolls can be placed on the ground for pallet pickup by another vehicle such as a forklift or the like.

Figure 15:
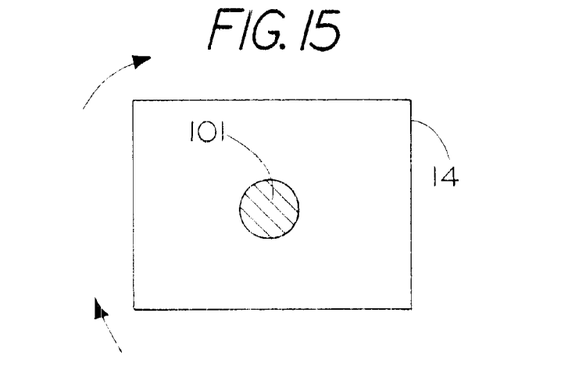
FIG. 15 is a partial schematic view illustrating the rotational support of the pickup mechanism.

FIG. 15 is a schematic mechanism to indicate the axial rotation of the sod pickup mechanism 14, which includes a positioning member for both lifting, moving and rotating the sod roll pickup mechanism to enable placement of sod rolls in a stack with the axis of the sod rolls extending perpendicular to each other as shown in FIG. 11.

With the present invention, the cutting and rolling of the sod occurs continuously, while the storing of sod rolls involves the intermittent operation of the sod accumulator to move sod rolls into a temporary storage position. Similarly, the transfer of sod rolls to the stack occurs intermittently since the sod rolls are only transferred to the sod stack when the accumulator is full of sod rolls.

It should be noted that this process of cutting, rolling and storing of sod is entirely automated and requires no special commands from the operator of the vehicle, but, if desired, each and every step can be manually overridden and controlled by an operator through the interface 18.

Figure 16:
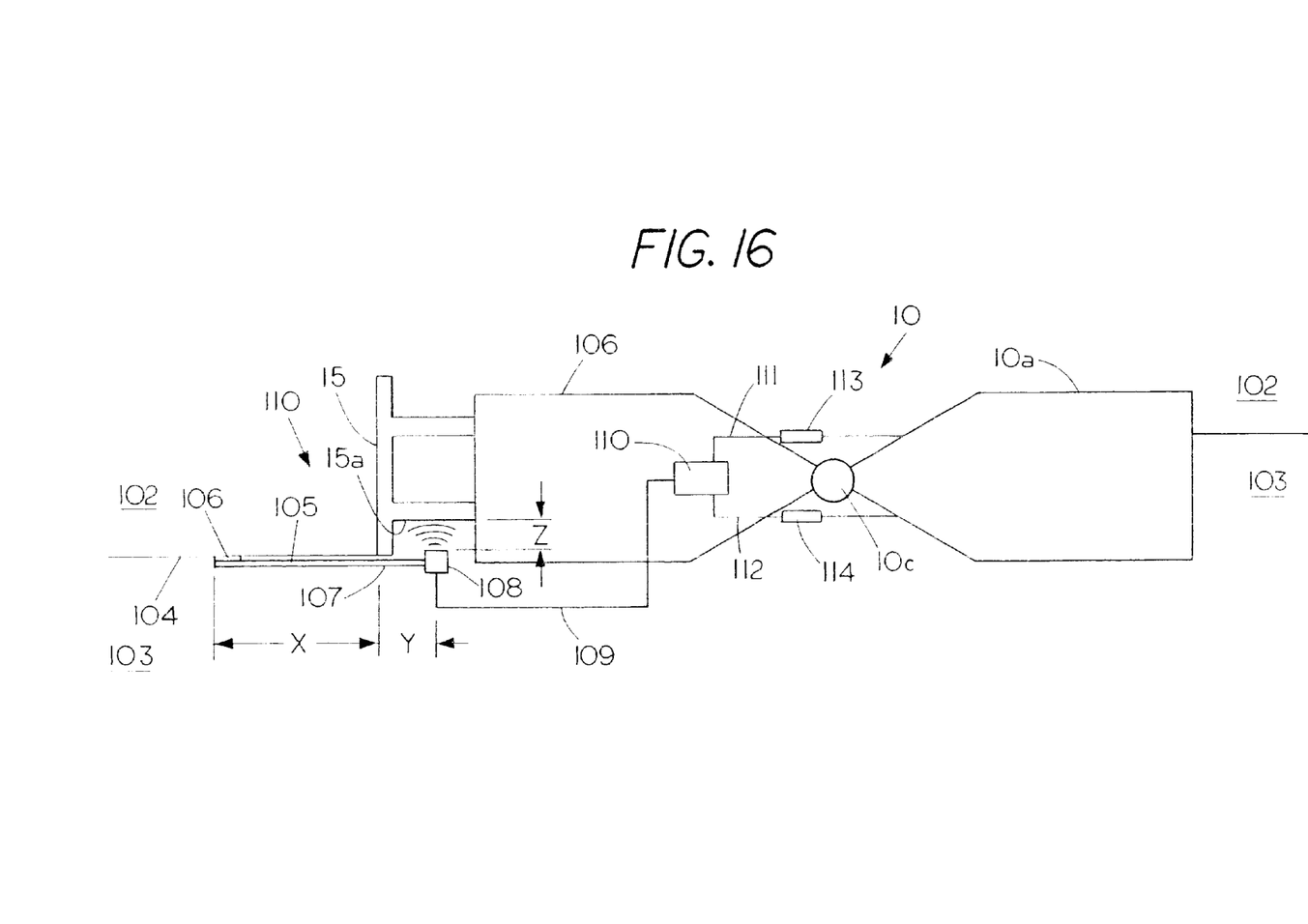
FIG. 16 is a partial schematic overhead view of sod harvester with the guidance control mechanism that maintains the sod harvester in a proper tracking condition.

Referring to FIG. 16 there is shown a partial schematic overhead view of sod harvester 10 with a sod harvester guidance system for maintaining a full cut. The sod harvester guidance system includes a steering control mechanism that includes a sonic sensor that maintains the sod harvester in a proper tracking condition through lateral displacement of a shoe that follows the cut sod. FIG. 16 shows sod harvester 10 includes front section 10b that is connected to rear section 10c by an articulation joint 10c. The sod harvester is shown on uncut sod 102 which is separated from cut sod area 103 by a step 104.

The a sod harvester guidance system for maintaining a full cut 110 includes a shoe 106 that follows the step 104 between the cut sod area 103 and the uncut sod 102. Shoe 105 is mounted on arm 105 that is pivotally connected to front section 10*b* by arm 115. Arm 105 projects a distance x from the pivot point 107 and extends a distance y beyond pivot point 107. The rear end of arm 105 carries a displacement member comprising a sonic transducer 108 that transfers displacement information of the rear end of arm 105 with respect to a reference surface 15*a*. That is, sonic transducer 108 generates a sonic wave that is reflected from frame surface 15*a* back to sonic transducer 108. The distance "z" traveled by the sonic wave causes the sonic transducer to generate an electrical output signal in accordance with the position of the transducer 108 with respect to reflecting surface 15*a*. By determining the distance of rear end of arm 15 with respect to reflecting surface one can generate an output signal for controlling harvester 10. The output signal from transducer 10 is sent to control unit 110 which includes a source of hydraulic fluid that can be directed to or from power cylinder 113 via conduit 111 or to and from power cylinder 114 via conduit 112. By obtaining the displacement information of arm 105 through sonic transducer 108 one can send a control signal to maintain the proper position of sod harvester 10 with control unit 110 which can deliver high pressure fluid to either power cylinder 113 or 114 to thereby control the direction of the sod harvester through angularly positioning the front 10*b* of harvester 10 with respect to the rear 10*a* of harvester.

We claim:

1. A sod harvester comprising:

a front section for removing a slab of sod from a field;

a rear section;

an articulated connection connecting said front section to said rear section with said front section steerable through the articulated connection to maintain the sod harvester in a tracking condition; and a tracking arm extending in a forward condition of the front section, said tracking arm includeing a shoe for following a step between an uncut sod field and a harvested sod field.

2. A The sod harvester of claim 1 wherein the tracking arm is pivotally mounted at a point between a first end and a second end with the second end connected to a displacement member.

3. A sod harvester comprising:

a front section for removing a slab of sod from a field;

a rear section;

an articulated connection connecting said front section to said rear section with said front section steerable through the articulated connection to maintain the sod harvester in a tracking condition; and a tracking arm extending in a forward condition of the front section, said tracking arm includes a shoe for following a step between an uncut sod field and a harvested sod field; said tracking arm is pivotally mounted at a point between a first end and a second end with the second end connected to a sonic transducer that determines the distance of the sonic transducer from a reflecting surface on the sod harvester.

4. The sod harvester of claim 3 wherein the displacement member connects to a hydraulic control system for directing high pressure fluid to a power cylinder to thereby cause the front section of the sod harvester to maintain a full cut.

5. A sod harvester comprising:

a front section for removing a slab of sod from a field;

a rear section;

an articulated connection connecting said front section to said rear section with said front section steerable through the articulated connection to maintain the sod harvester in a tracking condition;

a tracking arm extending in a forward condition of the front section, said tracking arm includes a shoe for following a step between an uncut sod field and a harvested sod field; said tracking arm pivotally mounted at a point between a first end and a second end with the second end connected to a displacement member; and a hydraulic control system, said hydraulic control system connected to said displacement member for directing high pressure fluid to a power cylinder to thereby cause the front section of the sod harvester to maintain a full cut.

6. A sod harvester comprising:

a vehicle for removing a slab of sod from a field;

a sonic transducer, a tracking arm extending in a forward condition of the vehicle, said tracking arm including a shoe for following a step between an uncut sod field and a harvested sod field; said tracking arm pivotally mounted thereon to enable the sonic transducer to determine the distance of the sonic transducer from a reflecting surface on the sod harvester to thereby steer the vehicle as sod is being cut from the uncut sod field.

* * * * *